United States Patent
Tiedemann et al.

(10) Patent No.: US 11,859,531 B2
(45) Date of Patent: Jan. 2, 2024

(54) HYDRAULIC AUXILIARY GENERATOR DRIVE

(71) Applicant: Volvo Construction Equipment AB, Eskilstuna (SE)

(72) Inventors: Heinz Tiedemann, Emmerthal (DE); Anton Mahler, Wennigsen (DE); Roland Wiktor, Hameln (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/592,898

(22) Filed: Feb. 4, 2022

(65) Prior Publication Data

US 2022/0252002 A1 Aug. 11, 2022

(30) Foreign Application Priority Data

Feb. 10, 2021 (EP) ..................................... 21156176

(51) Int. Cl.
| | | |
|---|---|---|
| *F02B 63/04* | (2006.01) | |
| *F02B 67/06* | (2006.01) | |
| *F02B 73/00* | (2006.01) | |
| *H02K 7/10* | (2006.01) | |
| *H02K 7/108* | (2006.01) | |

(52) U.S. Cl.
CPC ............ *F02B 63/042* (2013.01); *F02B 67/06* (2013.01); *F02B 73/00* (2013.01); *H02K 7/1004* (2013.01); *H02K 7/108* (2013.01)

(58) Field of Classification Search
CPC ...... H02K 7/108; H02K 7/1004; F02B 73/00; F02B 7/06
See application file for complete search history.

(56) References Cited

U.S. PATENT DOCUMENTS

| | | |
|---|---|---|
| 8,080,888 B1 | 12/2011 | Daley |
| 2006/0107920 A1 | 5/2006 | Serkh et al. |
| 2010/0296866 A1 | 11/2010 | Braun et al. |
| 2013/0259571 A1 | 10/2013 | Thiesse et al. |
| 2019/0047569 A1 | 2/2019 | Lachmann et al. |

FOREIGN PATENT DOCUMENTS

| | | | |
|---|---|---|---|
| DE | 102012023419 A1 * | 6/2014 | ............ B60K 25/02 |
| DE | 102012023419 A1 | 6/2014 | |
| KR | 20180134203 A | 12/2018 | |

OTHER PUBLICATIONS

Extended European Search Report dated Aug. 5, 2021 for European Patent Application No. 21156176.6, 8 pages.

\* cited by examiner

*Primary Examiner* — Kevin A Lathers
(74) *Attorney, Agent, or Firm* — Sage Patent Group

(57) ABSTRACT

An auxiliary generator drive for a belt driven generator being powered by an internal engine, the auxiliary generator drive including a hydraulic motor, wherein the hydraulic motor is arranged and adapted to drive the generator and to be driven via a hydraulic pump powered by the internal engine.

16 Claims, 3 Drawing Sheets

HYDRAULIC AUXILIARY GENERATOR DRIVE

CROSS-REFERENCE TO RELATED APPLICATIONS

The present application claims benefit of priority to European Patent Application No. 21156176.6, filed Feb. 10, 2021, and is assigned to the same assignee as the present application and is incorporated herein by reference.

TECHNICAL FIELD

The disclosure relates to an auxiliary generator drive, a drive system for a working machine, a method for operating a working machine, a computer program, a computer readable medium and a control unit for a working machine.

The disclosure is applicable on working machines within the fields of industrial construction machines or construction equipment, in particular pavers. Although the disclosure will be described with respect to a paver, the disclosure is not restricted to this particular machine, but may also be used in other working machines.

BACKGROUND

A generator is usually used in paver machines to heat the screed so that the asphalt cannot stick to the floor slab. This generator is of significant power and is often driven by belts (V-belt or V-ribbed belts). The generator power in road pavers has continued to increase to these days. The belt drive has established itself as the best technical and economical compromise. This principle is limited by the permissible lateral force on the shaft of the drive motor. With increased utilization, the maintenance effort (tensioning) increases significantly and the service life also decreases remarkably. In order to limit the belt forces, correspond-ingly higher speeds of the drive motor are necessary for the same required power. This has a negative impact on noise behaviour and efficiency.

There are solutions in which the generator is propelled by an open circuit hydrostatic drive. These solutions have characteristic weaknesses, especially in the event of transient load changes. Depending on the implementation, the drives tend to oscillate unpleasantly. The system can be improved by choosing a closed hydrostatic circuit. However, the costs will rise significantly and the efficiency is disadvantageous in comparison to a direct drive.

It is possible to attach the generator to the pump distributor gear box so that there is a direct mechanical drive. However, torsional vibrations can be problematic with such designs. A pump distributor gearbox is more complex, as well, and, above all, the space required in a paver and other machinery is unfavourable to such designs.

US 2013/259571 A1 shows a paver, where when braking is required during normal operating conditions pursuant to one or more elements of the machine deceleration system, the hydraulic pump is destroked and stops the provision of pressurized fluid to the one or more hydraulic motors of the machine drive train, and the deceleration system extracts translational energy from the drive train via frictional or other interaction with the machine drive train. Thus the generator is driven by the engine during normal operation and or by regenerative braking in order to dispel the kinetic energy of the paver by heating the screed and slow down the paver. In KR 20180134203, US 2006/107920 A1, and US 2010/296866 A1 systems with a second engine additional to the internal engine are described.

SUMMARY

According to one embodiment an auxiliary generator drive for a belt driven generator is powered by an internal engine and includes a hydraulic motor that drives the generator and is driven via a hydraulic pump powered by the internal engine.

According to another embodiment, a method for operating a working machine, such as a paver, including an internal engine coupled to a generator via a crankshaft and a belt drive and an auxiliary generator drive comprising a hydraulic motor arranged and adapted to drive the generator and to be driven via a hydraulic pump powered by the internal engine, includes the steps of: determining an output demand for the generator and based on the output demand for the generator activating the auxiliary generator drive if a predetermined output demand is exceeded.

ASPECTS

According to one aspect of the disclosure, an auxiliary generator drive for a belt driven generator that is powered by an internal engine, includes a hydraulic motor that drives the generator and is driven via a hydraulic pump powered by the internal engine. The hydraulic motor is thus driven directly via the hydraulic pump.

In some embodiments, the hydraulic motor is coupled to the generator via a first one-way clutch.

In some embodiments, the hydraulic motor is connected to the hydraulic pump via a pressure control valve or via a flow control valve.

In some embodiments, the hydraulic motor is coupled to the generator at a free end of the generator shaft or at a pulley.

In some embodiments, the hydraulic motor is adapted to be operated in a closed hydraulic circuit with the hydraulic pump.

In some embodiments, the hydraulic motor is a variable-displacement motor.

In some embodiments, a pressure sensor is arranged at a supply line of the hydraulic motor.

In some embodiments, a drive system for a working machine includes the internal engine coupled to the generator via a crankshaft and a belt drive and the auxiliary generator drive previously described coupled to the generator and the internal engine.

In some embodiments, the generator is coupled to the belt drive via a second one-way clutch.

In some embodiments, the internal engine is a combustion engine.

In some embodiments, the hydraulic pump is coupled to the internal engine via a power take-off.

In some embodiments, the hydraulic motor is connected to the hydraulic pump via at least one hydraulic valve.

In some embodiments a working machine, such as a paver, is equipped with a drive system including the internal engine coupled to the generator via a crankshaft and a belt drive and the auxiliary generator drive previously described coupled to the generator and the internal engine.

In some embodiments, the working machine is a paver

In some embodiments, the hydraulic motor is coupled to the generator via a first one-way clutch.

In some embodiments, the hydraulic motor is connected to the hydraulic pump via a pressure control valve or via a flow control valve.

In some embodiments the working machine further comprises a control unit for controlling an operation of the working machine, the control unit being adapted to perform a method for operating the working machine including the steps of determining an output demand for the generator and based on the output demand for the generator activating the auxiliary generator drive if a predetermined output demand is exceeded.

According to another aspect of the disclosure, a method for operating a working machine, preferably a paver, including an internal engine coupled to a generator via a crankshaft and a belt drive and an auxiliary generator drive including a hydraulic motor that drives the generator and is driven via a hydraulic pump powered by the internal engine, includes the steps of determining an output demand for the generator and based on the output demand for the generator activating the auxiliary generator drive if a predetermined output demand is exceeded.

In some embodiments, the auxiliary generator drive is activated additionally to the to the belt drive and a speed of the internal engine may be reduced when the auxiliary generator drive is activated.

In some embodiments, the generator is coupled to the belt drive via a second one-way clutch and the auxiliary generator drive is activated with higher speed than the speed of the belt drive, if the predetermined output demand is exceeded.

In some embodiments, a speed and/or torque of the auxiliary generator drive is controlled via a pressure control valve or a flow control valve between the hydraulic motor and the hydraulic pump.

Preferably, the method is performed by a computer program comprising program code run on a computer.

In some embodiments, the method is performed by a computer readable medium carrying a computer program comprising program code run on a computer.

In some embodiments, the method is performed by a control unit for controlling an operation of a working machine.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS OF THE DISCLOSURE

Figure 1:
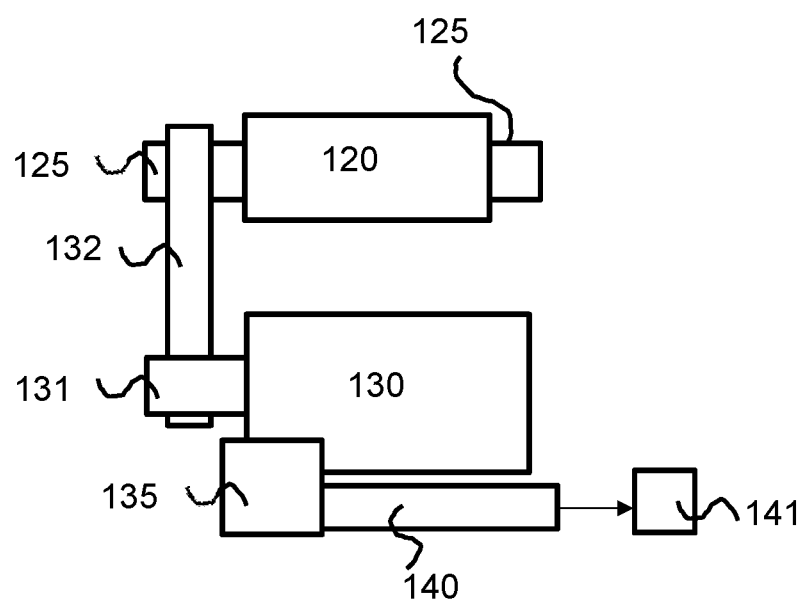
FIG. 1 shows a drive system for a working machine according to the state of the art.

FIG. 1 shows a drive system for a working machine, here a paver, according to the state of the art. In the state of the art pavers are equipped with a generator. The arrangement of the drive system consists of the internal combustion engine 130 with a crankshaft 131. At least one hydraulic pump 140 is usually flanged to a power take-off 135 and drives a wide variety of consumers by means of at least one hydraulic valve 141. An electric generator 120 is driven via the crankshaft 131 by means of a belt drive 132. The generator 120 is for example used to heat a screed. Since the transferable power is limited by permissible transverse forces on the crankshaft bearing, this arrangement is disadvantageous.

Figure 2:
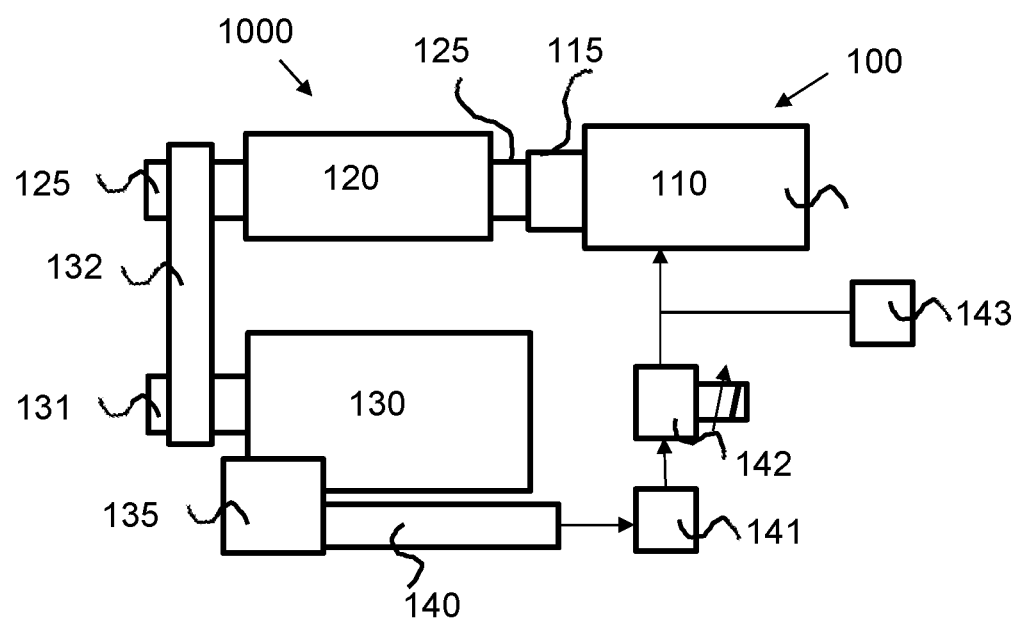
FIG. 2 is a schematic drawing of a first embodiment of a drive system.

In the shown drive system 1000 according to an embodiment of the present disclosure in FIG. 2, the known drive system according to the state of the art is additionally equipped with an auxiliary generator drive 100 for the belt driven generator 120. The generator 120 is powered in normal state by the internal engine 130. For higher loads the generator 120 is connected with a hydraulic motor 110 of the auxiliary generator 100. The hydraulic motor 110 is arranged and adapted to drive the generator 120 and to be driven via a hydraulic pump 140 powered by the internal engine 130. The hydraulic motor is driven directly by the hydraulic pump, connected via hydraulic valves 141.

With this embodiment the advantages of the belt drive being simple and economical are maintained while additional power can be delivered by the hydraulic motor. Thus advantageously, in the present embodiment, the belt drive can be maintained, but in a power-reduced version, so that the transverse forces on the drive motor are reduced, when an auxiliary generator drive in form of a hydraulic motor is used. In this embodiment in the predominant normal load cases, when the generator is only operated with medium power, the belt drive is used and embodies a highly efficient, simple and robust drive. Since the maximum or high generator output is only called up intermittently (e.g. in the heating-up phase at the start of work), the additional output may be required for this is transmitted using the hydraulic motor as a hydrostatic auxiliary drive. The hydraulic motor is driven directly via the hydraulic pump. Thus the hydraulic motor can react to a power demand of the generator without power limitations of intermediate elements like for example accumulators. The hydraulic motor in this embodiment can be driven by the internal engine via the (existing) hydraulic pump. As in the high load situations, only a few of the other hydraulic drives of a working machine are typically in operation, the hydraulic motor can be driven by existing hydraulic components with the internal engine. Thus no additional engine is needed and high loads of the generator can be provided with a relatively compact system with only an additional hydraulic motor.

Thus, the additional drive relieves the belt drive and is itself powered by the already present internal engine 130 and the further hydraulic components, hydraulic pump 140 and hydraulic valves 141. The hydraulic motor is connected to the hydraulic pump via at least one hydraulic valve. Hydraulic valves are widely used in existing working machines for different applications. The use of hydraulic valves, especially of a pressure control valve or a flow control valve has the advantage to be able to control the power output of the hydraulic motor and thus the auxiliary generator drive precisely. For the hydraulic motor 110 existing hydraulic valves 141 of an existing drive system can be used, as when the hydraulic motor is in use most other hydraulic applications are not. Alternatively, a dedicated hydraulic pump or a dedicated hydraulic valve can be used.

In the embodiment illustrated, the hydraulic pump 140 is connected to the internal engine 130, which may be a combustion engine, via a power-take off 135. Combustion engines are widely used in existing working machines. Thus this embodiment can be used with existing drives. No new drive systems are required.

As shown, the hydraulic motor 110 is flanged to the generator 120 by means of a one-way clutch 115. Installation is shown at the free shaft end of the generator shaft 125, but alternative arrangements can be utilized, such as, for example, coupling the hydraulic motor to the pulley. The freewheel may be designed such that the hydraulic motor 110 can drive the generator 120 but is not driven by the generator. This prevents drag losses when the hydraulic motor is not activated. Although a dedicated hydraulic motor 110 may be provided, advantageously since the other working hydraulic functions of a paver are hardly used in heavy heating operation, the hydraulic motor 110 can be one that powers other hydraulic functions when not driving the generator 110.

In the shown embodiment the hydraulic motor 110 may be controlled from an existing circuit of hydraulic components (hydraulic pump 140 and hydraulic valves 141) by means of a pressure control valve 142. In the version shown here, additional torque (pressure control) can be controlled in a defined manner. The forces in the belt drive can thus be reduced in a targeted manner. The hydraulic motor can also be connected to the hydraulic pump via a flow control valve. These embodiments also allow a defined torque to be applied by the hydraulic motor, i.e. the additional torque provided by the hydraulic motor is controlled and regulated via pressure or flow control for the hydraulic motor. Furthermore in an embodiment not shown here the hydraulic motor is a variable-displacement motor, which allows for further variation and control of the torque. As the variable-displacement motor provides variable torque and variable speed. With input flow and pressure constant, the torque speed ratio thus can be varied and controlled to meet load requirements by varying the displacement.

Furthermore the hydraulic motor 110 can be monitored by a pressure sensor 143 and the generator power can be reduced if the belt forces are exceeded.

The hydraulic motor can be adapted in an embodiment to be operated in a closed hydraulic circuit with the hydraulic pump, which allows for higher speed and is favourable for the use in vehicle and working machines.

Working machines, especially pavers occasionally need high generator output in some working situations. This higher output can be favourably provided by the drive system with an auxiliary generator drive according to the described embodiments.

In one embodiment, a method for operating a working machine, such as a paver, comprising an internal engine coupled to a generator via a crankshaft and a belt drive and an auxiliary drive comprising a hydraulic motor, the hydraulic motor is arranged and adapted to drive the generator and to be driven via a hydraulic pump by the internal engine, as described above, comprises determining an output demand for the generator, based on the output demand for the generator activating the auxiliary drive if a predetermined output demand is exceeded. In a further embodiment of the method the auxiliary drive is activated additionally to the to the belt drive and a speed of the internal engine may be reduced when the auxiliary drive is activated. This allows to spare the belt drive and the internal engine and reduces noises.

Figure 3:
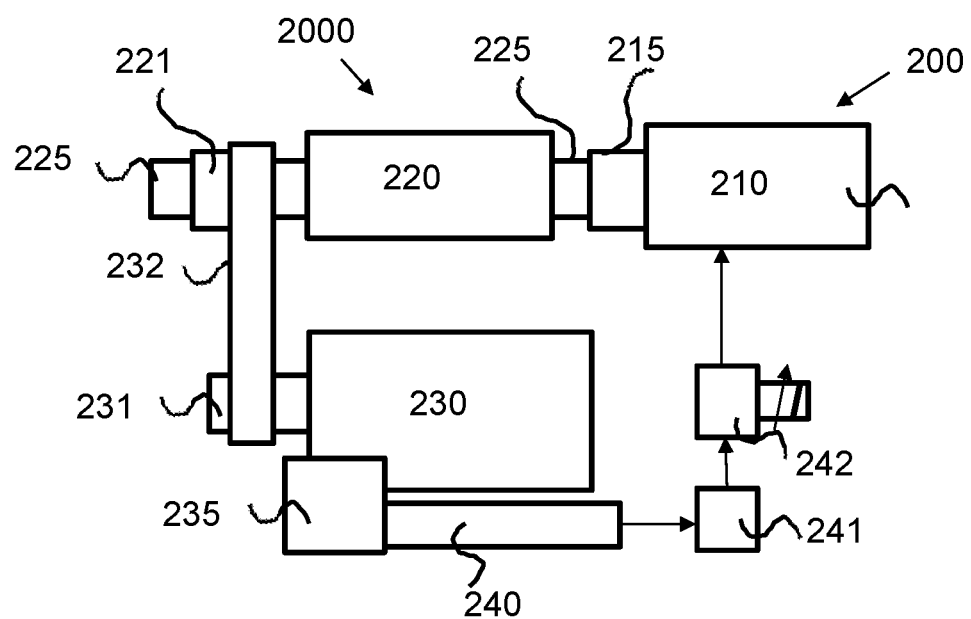
FIG. 3 is a schematic drawing of a second embodiment of a drive system.

FIG. 3 shows a second embodiment of a drive system 2000 according to the disclosure. In this embodiment the generator 220 is decoupled from the belt drive by means of a second one-way clutch 221, which is arranged between generator shaft 225 and belt drive 232. Thus the generator 220 can also rotate faster than specified by the belt drive 232. The further components of this embodiment correspond to the embodiment shown in FIG. 2. The hydraulic motor 210 is connected via a first one-way clutch 215 to the generator 220 and is arranged and constructed to drive the generator 220. The hydraulic motor 210 itself is driven by the internal engine 230 via the hydraulic pump 240 and the hydraulic valve 241. The hydraulic pump 240 is connected to the internal engine 230 via a power-take off 235. Favourably, the hydraulic motor 210 should in this arrangement be operated at a defined speed, e.g. is set by a flow control valve 242. However, speed control is also possible with the aid of the previously mentioned pressure control valve, shown in the embodiment of FIG. 2. In this embodiment, the generator 220 can be driven only by the additional hydraulic drive 200. In this case the internal combustion engine 230 remains e.g. at a low speed, although the generator 220 is operated at a high speed. For example the generator 220 can turn around driven by the additional hydraulic drive 200 to generate a desired voltage frequency. This is advantageous for example if electrical tools are to be operated on the generator network (e.g. 230V, 50 Hz).

One-way clutches on the generator allow the speeds to be decoupled in such a way that mutual hindrance is excluded. In this embodiment the generator is decoupled from the belt drive by means of the second one-way clutch, so that it can also rotate faster than specified by the belt drive. In this embodiment, the generator may optionally only be driven via the hydraulic motor. Then the internal combustion engine remains e.g. at a low speed, although the generator is operated at a high speed.

In this embodiment, when the generator is coupled to the belt drive via a second one-way clutch, the auxiliary generator drive can be activated with higher speed than the speed of the belt drive, if the predetermined output demand is exceeded. Thus the speed of the generator is determined by the hydraulic motor only and the belt is decoupled to allow for higher speed than specified for the belt.

With the embodiments of the disclosure described above the advantages of a belt-driven generator are retained. The auxiliary drive only has to be used if a large generator output is occasionally called up. Furthermore the auxiliary drive can be used to operate the drive motor at low speed, which also means at low noise and high efficiency. A possibly required high generator speed can be generated via the additional drive and thus the belt drive is spared. The internal engine thus determines the generator speed if there is sufficient motor speed and the generator power is sufficient. The auxiliary generator drive on the other hand determines the generator speed if the drive motor speed should only be low, which means in situations when low noise and/or high efficiency is required and the belt drive should be spared. This thus allows the belt drive to be used to drive the generator at lower speeds and with lower tensioning and allows the hydraulic motor to augment the power of the belt drive, such as for example when peak generator power is required, such as, for example, when first heating up the paver screed.

It is to be understood that the drive system for a working machine, the method for operating a working machine, the computer program, the computer readable medium and the control unit for a working machine according to the further aspects of the disclosure share the advantages of the additional generator drive according to the disclosure.

It is further to be understood that the present disclosure is not limited to the embodiments described above and illustrated in the drawings; rather, the skilled person will recognize that many changes and modifications may be made within the scope of the appended claims.

The invention claimed is:

1. An auxiliary generator drive for a belt driven generator being powered by an internal engine, the auxiliary generator drive comprising a hydraulic motor, wherein the hydraulic motor is arranged and adapted to selectively drive the generator simultaneously with the belt; and to be driven via a hydraulic pump powered by the internal engine.

2. The auxiliary generator drive according to claim 1, wherein the hydraulic motor is coupled to the generator via a first one-way clutch.

3. The auxiliary generator drive according to claim 1, wherein the hydraulic motor is connected to the hydraulic pump via a pressure control valve or via a flow control valve.

4. The auxiliary generator drive according to claim 1, wherein the hydraulic motor is coupled to the generator at a free end of the generator shaft or at a pulley.

5. The auxiliary generator drive according to claim 1, wherein the hydraulic motor is adapted to be operated in a closed hydraulic circuit with the hydraulic pump.

6. The auxiliary generator drive according to claim 1, wherein the hydraulic motor is a variable-displacement motor.

7. The auxiliary generator drive according to claim 1, wherein a pressure sensor is arranged at a supply line of the hydraulic motor.

8. A drive system for a working machine comprising an internal engine coupled to a generator via a crankshaft and a belt drive and an auxiliary drive according to claim 1 coupled to the generator and the internal engine.

9. The drive system to claim 8, wherein the generator is coupled to the belt drive via a second one-way clutch.

10. The auxiliary generator drive according to claim 1, wherein the hydraulic motor is further arranged and adapted to selectively drive the generator simultaneously with the belt based on an output demand determination for the electric generator.

11. Method for operating a working machine comprising an internal engine coupled to a generator via a crankshaft and a belt drive and an auxiliary generator drive comprising a hydraulic motor that drives the generator and is driven via a hydraulic pump powered by the internal engine, said method comprising:
   determining an output demand for the generator, and
   based on the output demand for the generator activating the auxiliary generator drive if a predetermined output demand is exceeded.

12. Method according to claim 11, wherein the auxiliary generator drive is activated additionally to the belt drive and a speed of the internal engine may be reduced when the auxiliary generator drive is activated or wherein the generator is coupled to the belt drive via a second one-way clutch and the auxiliary generator drive is activated with higher speed than the speed of the belt drive, if the predetermined output demand is exceeded.

13. Method according to claim 11, wherein a speed and/or torque of the auxiliary generator drive is controlled via a pressure control valve or a flow control valve between the hydraulic motor and the hydraulic pump.

14. A computer program comprising program code means for performing the steps of the method of claim 11, when said program is run on a computer.

15. A computer readable medium carrying a computer program comprising program code means for performing the steps of the method of claim 11, when said program product is run on a computer.

16. A control unit for controlling an operation of a working machine comprising an internal engine coupled to a generator via a crankshaft and a belt drive and an auxiliary generator drive comprising a hydraulic motor, wherein the hydraulic motor is arranged and adapted to drive the generator and to be driven via a hydraulic pump powered by the internal engine, the control unit being configured to perform the steps of the method according to claim 11.

* * * * *